(12) United States Patent
Yamazaki et al.

(10) Patent No.: US 6,740,443 B2
(45) Date of Patent: May 25, 2004

(54) POLYMER ELECTROLYTE FUEL CELL

(75) Inventors: Tatsuto Yamazaki, Moriguchi (JP); Yoshiaki Yamamoto, Katano (JP); Hiroki Kusakabe, Sakai (JP); Hideo Ohara, Katano (JP); Nobuhiro Hase, Neyagawa (JP); Shinsuke Takeguchi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 10/023,907

(22) Filed: Dec. 21, 2001

(65) Prior Publication Data

US 2002/0119359 A1 Aug. 29, 2002

(30) Foreign Application Priority Data

Dec. 27, 2000 (JP) ........................................ 2000-399057

(51) Int. Cl.⁷ ................................................ H01M 2/14
(52) U.S. Cl. ............................ 429/38; 429/32; 429/26
(58) Field of Search ............................. 429/34, 38, 39, 429/30, 26, 32, 12, 19

(56) References Cited

U.S. PATENT DOCUMENTS

2002/0012827 A1 * 1/2002 Mizuno et al. ............... 429/34

FOREIGN PATENT DOCUMENTS

| JP | 09-035726 | 7/1997 | |
| JP | 2000-133289 | * 5/2000 | ............ H01M/8/02 |

* cited by examiner

Primary Examiner—Raymond Alejandro

(57) ABSTRACT

A polymer electrolyte fuel cell including a plurality of membrane electrode assemblies and a plurality of conductive separators, wherein the plurality of conductive separators include at least one separator comprising: a fuel gas inlet-side manifold aperture; a fuel gas outlet-side manifold aperture; a gas flow channel for fuel gas formed on an anode-side of the separator; an inlet-side through hole and an outlet-side through hole penetrating the separator which are formed at an inlet-side end and an outlet-side end of the gas flow channel for fuel gas; and an inlet-side connection groove and an outlet-side connection groove for connecting the inlet-side and outlet-side through holes with the fuel gas inlet-side manifold aperture and the fuel gas outlet-side manifold aperture, respectively, which are formed on a cathode-side of the separator.

8 Claims, 14 Drawing Sheets

POLYMER ELECTROLYTE FUEL CELL

BACKGROUND OF THE INVENTION

The present invention relates to a fuel cell comprising a solid polymer electrolyte used for portable power sources, electric vehicle power sources, domestic cogeneration systems, etc.

A fuel cell comprising a solid polymer electrolyte generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions, and a pair of electrodes formed on both surfaces of the polymer electrolyte membrane. The electrode usually comprises a catalyst layer which is composed mainly of carbon particles carrying a platinum group metal catalyst and a diffusion layer which has both gas permeability and electronic conductivity and is formed on the outer surface of the catalyst layer.

Moreover, gaskets or gas sealing materials are arranged on the outer periphery of the electrodes with the polymer electrolyte membrane therebetween so as to prevent a fuel gas and an oxidant gas from leaking out or prevent these two kinds of gases from mixing together. The gaskets are combined integrally with the electrodes and polymer electrolyte membrane beforehand. This is called "MEA" (membrane electrode assembly). Disposed outside the MEA are conductive separators for mechanically securing the MEA and for connecting adjacent MEAs electrically in series. The separators have a gas flow channel for supplying a reaction gas to the electrode surface and for removing a generated gas and an excess gas at a portion to come in contact with the MEA. Although the gas flow channel may be provided separately from the separators, grooves are usually formed on the surfaces of the separators to serve as the gas flow channel.

In order to supply the gas to such grooves, it is necessary to use a piping jig, called "manifold", which branches out, depending on the number of the separators, into the grooves of the respective separators from a gas supply pipe. This type of manifold, directly connecting the gas supply pipe to the grooves of the separators, is specifically called "external manifold". There is also another type of manifold, called "Internal manifold", which has a more simple structure. In the internal manifold, the separators with the gas flow channel formed thereon are provided with through holes, called "manifold aperture", which are connected to the inlet and outlet of the gas flow channel, and the gas is supplied directly from the manifold apertures.

Since the fuel cell generates heat during operation, it needs cooling with cooling water or the like to keep good temperature conditions. Thus, a cooling section for flowing the cooling water therein is generally inserted between the separators for every one to three cells, and the cooling section is often formed by providing the backside of the separator with a cooling water flow channel. In a general structure of the fuel cell, the MEAs, separators and cooling sections, as described above, are alternately stacked to form a stack of 10 to 200 cells, and the resultant cell stack is sandwiched by end plates with a current collector plate and an insulating plate interposed between the cell stack and each end plate and is clamped with clamping bolts from both sides.

In such a polymer electrolyte fuel cell, the separators need to have a high conductivity, high gas tightness, and high corrosion resistance to oxidation/reduction reactions of hydrogen/oxygen. For such reasons, conventional separators are usually formed from carbon materials such as graphite and expanded graphite, and the gas flow channel is formed by cutting the surface of the separator or by molding in the case of expanded graphite separator.

The fuel cell produced in the above-described manner is supplied with the fuel gas, oxidant gas and cooling water to examine the performance of the fuel cell or of a unit cell of the fuel cell.

The prior art fuel cell, comprising the cell stack in which the MEA is disposed between two conventional conductive separators, poses a large problem resulting from the separators. Specifically, in such a fuel cell, the gasket arranged on the periphery of the MEA is pressed to fall into the gas flow channel of one of the two separators due to the clamping pressure of the fuel cell, thereby to form a clearance between the gasket of the MEA and the other separator. Such a clearance is liable to occur at the ends of the gas flow channel in the vicinity of the manifold apertures. Through the clearance, two kinds of gases mix with each other, resulting in deterioration of cell performance. Also, the mixing of the gasses may cause explosion or firing, thus inviting dangerous situations.

BRIEF SUMMARY OF THE INVENTION

In view of the above problem of the prior art fuel cell, an object of the present invention is to provide a polymer electrolyte fuel cell free from mixing of two kinds of gases by improving separators.

Another object of the invention is to provide an improved separator that causes no mixing of two kinds of gasses.

The present invention is characterized in that in a conductive separator, the position at which the end of a gas flow channel is connected with a manifold aperture is changed in order to prevent mixing of the gases. Therefore, even if a gasket is pressed down toward the gas flow channel of the separator to form a clearance in the contacting portion of the gasket of an MEA and the separator in the vicinity of the manifold aperture in which a gas flows, the same kind of gas as the gas of the manifold aperture flows through the clearance, so that the mixing of the two kinds of gases does not occur in the present invention.

The present invention provides a polymer electrolyte fuel cell comprising:

a fuel cell stack comprising a plurality of conductive separators and a plurality of membrane electrode assemblies that are stacked with one of the conductive separators interposed therebetween, each of the membrane electrode assemblies comprising a polymer electrolyte membrane, and an anode and a cathode sandwiching the polymer electrolyte membrane;

a means for supplying a fuel gas to the anode; and a means for supplying an oxidant gas to the cathode, wherein the plurality of conductive separators comprise at least one separator comprising: a fuel gas inlet-side manifold aperture; a fuel gas outlet-side manifold aperture; a gas flow channel for supplying the fuel gas to the anode which is formed on an anode-side of the separator; an inlet-side through hole and an outlet-side through hole penetrating the separator which are formed at an inlet-side end and an outlet-side end of the gas flow channel for fuel gas; and an inlet-side connection groove and an outlet-side connection groove for connecting the inlet-side and outlet-side through holes with the fuel gas inlet-side manifold aperture and the fuel gas outlet-side manifold aperture, respectively, which are formed on a cathode-side of the separator.

It is preferable that the membrane electrode assembly further comprises a gasket covering an outer periphery of the anode and the cathode and that the gasket comprises a fuel gas inlet-side manifold aperture and a fuel gas outlet-side manifold aperture.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
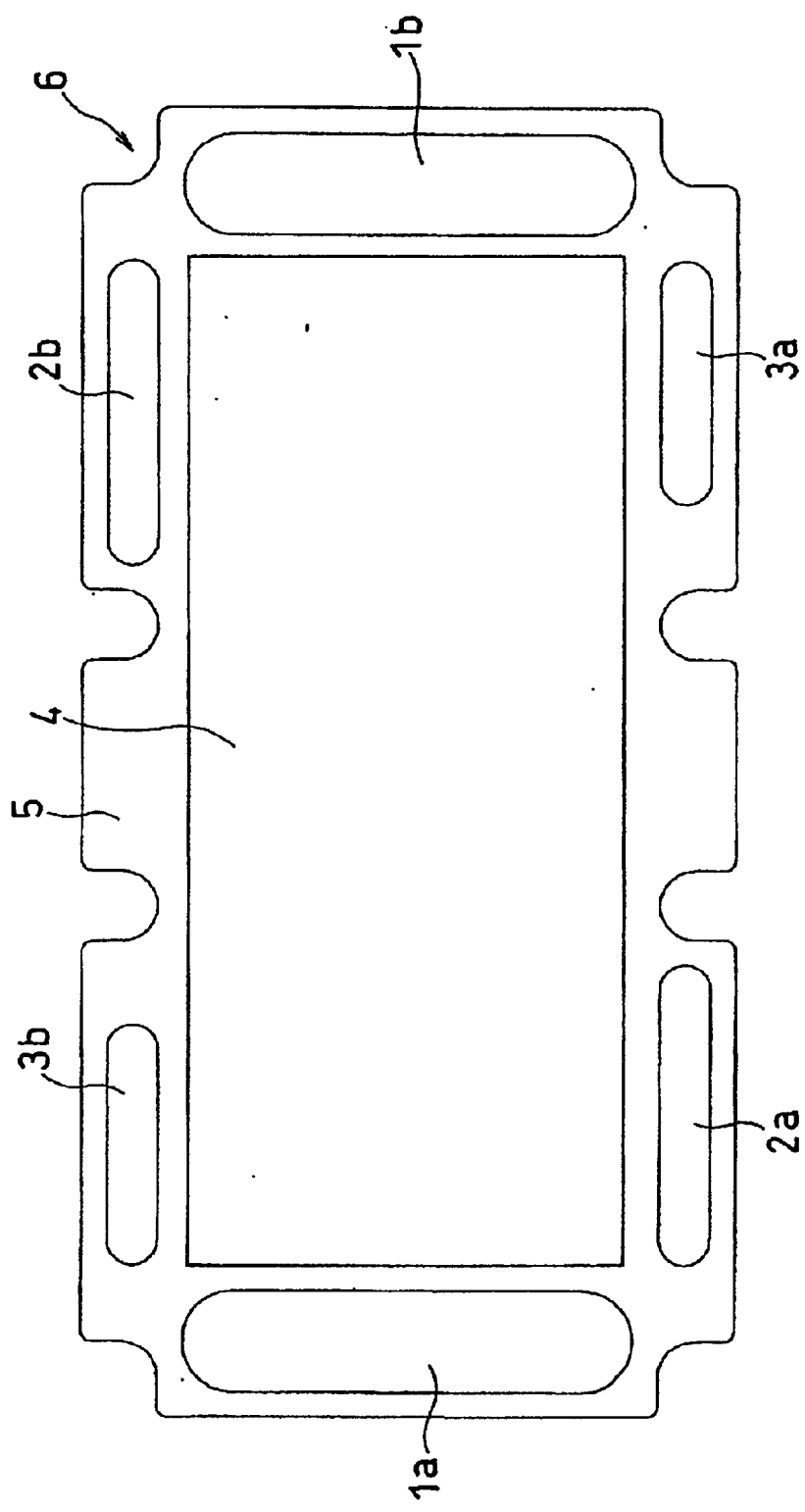
FIG. 1 is a front view illustrating a membrane electrode assembly of a fuel cell in one embodiment of the present invention.

The present invention provides a polymer electrolyte fuel cell comprising a plurality of conductive separators and a plurality of membrane electrode assemblies, wherein the plurality of conductive separators comprise at least one separator comprising: a fuel gas inlet-side manifold aperture; a fuel gas outlet-side manifold aperture: a gas flow channel for supplying the fuel gas to the anode which is formed on an anode-side of the separator; an inlet-side through hole and an outlet-side through hole penetrating the separator which are formed at an inlet-side end and an outlet-side end of the gas flow channel for fuel gas; and an inlet-side connection groove and an outlet-side connection groove for connecting the inlet-side and outlet-side through holes with the fuel gas inlet-side manifold aperture and the fuel gas outlet-side manifold aperture, respectively, which are formed on a cathode-side of the separator.

In a preferred mode of the conductive separator, the at least one separator further comprises: an oxidant gas inlet-side manifold aperture; an oxidant gas outlet-side manifold aperture; a gas flow channel for supplying the oxidant gas to the cathode which is formed on the cathode-side; an inlet-side through hole and an outlet-side through hole penetrating the separator which are formed at an inlet-side end and an outlet-side end of the gas flow channel for oxidant gas; and an inlet-side connection groove and an outlet-side connection groove for connecting the inlet-side and outlet-side through holes with the oxidant gas inlet-side manifold aperture and the oxidant gas outlet-side manifold aperture, respectively, which are formed on the anode-side.

In another preferred mode of the conductive separator, the at least one separator further comprises a cooling water inlet-side manifold aperture and a cooling water outlet-side manifold aperture, the plurality of conductive separators comprise a combination of two separator members consisting of an anode-side separator member and a cathode-side separator member, each separator member comprising at least a fuel gas inlet-side manifold aperture, a fuel gas outlet-side manifold aperture, a cooling water inlet-side manifold aperture, and a cooling water outlet-side manifold aperture, the two separator members being combined in such a manner that their backsides are in contact with each other, the anode-side separator member further comprises: a gas flow channel for supplying the fuel gas to the anode which is formed on an anode-side of the anode-side separator member; an inlet-side through hole and an outlet-side through hole penetrating the anode-side separator member which are formed at an inlet-side end and an outlet-side end of the gas flow channel; and an inlet-side connection groove and an outlet-side connection groove for connecting the inlet-side and outlet-side through holes with the fuel gas inlet-side manifold aperture and the fuel gas outlet-side manifold aperture, respectively, which are formed on the backside of the anode-side separator member, at least one of the two separator members has, on the backside thereof, a cooling water flow channel communicating with the cooling water inlet-side manifold aperture and the cooling water outlet-side manifold aperture such that the cooling water flow channel is formed between the two separator members, and the respective manifold apertures of the at least one separator communicate with the corresponding manifold apertures of each of the two separator members.

In still another preferred mode of the conductive separator, the at least one separator further comprises an oxidant gas inlet-side manifold aperture and an oxidant gas outlet-side manifold aperture, the two separator members further comprise an oxidant gas inlet-side manifold aperture and an oxidant gas outlet-side manifold aperture, the cathode-side separator member further comprises: a gas flow channel for supplying the oxidant gas to the cathode which is formed on a cathode-side of the cathode-side separator member; an inlet-side through hole and an outlet-side through hole penetrating the cathode-side separator member which are formed at an inlet-side end and an outlet-side end of the gas flow channel; and an inlet-side connection groove and an outlet-side connection groove for connecting the inlet-side and outlet-side through holes with the oxidant gas inlet-side manifold aperture and the oxidant gas outlet-side manifold aperture, respectively, which are formed on the backside of the cathode-side separator member, and the respective oxidant gas manifold apertures of the at least one separator communicate with the corresponding oxidant gas manifold apertures of each of the two separator members.

In another preferred mode of the conductive separator, the at least one separator further comprises a cooling water inlet-side manifold aperture and a cooling water outlet-side manifold aperture, the plurality of conductive separators comprise a combination of two separator members consisting of an anode-side separator member and a cathode-side separator member, each separator member comprising at least a fuel gas inlet-side manifold aperture, a fuel gas outlet-side manifold aperture, a cooling water inlet-side manifold aperture, and a cooling water outlet-side manifold aperture, the two separator members being combined in such a manner that their backsides are in contact with each other, the anode-side separator member further comprises: a gas flow channel for supplying the fuel gas to the anode which is formed on an anode-side of the anode-side separator member; and an inlet-side through hole and an outlet-side through hole for fuel gas penetrating the anode-side separator member which are formed at an inlet-side end and an outlet-side end of the gas flow channel, the cathode-side separator member further comprises: an inlet-side through hole and an outlet-side through hole for fuel gas communicating with the inlet-side and outlet-side through holes for fuel gas of the anode-side separator member; and an inlet-side connection groove and an outlet-side connection groove for connecting the inlet-side and outlet-side through holes for fuel gas of the cathode-side separator member with the fuel gas inlet-side manifold aperture and the fuel gas outlet-side manifold aperture, respectively, which are formed on a cathode-side of the cathode-side separator member, at least one of the two separator members has, on the backside thereof, a cooling water flow channel communicating with the cooling water inlet-side manifold aperture and the cooling water outlet-side manifold aperture such that the cooling water flow channel is formed between the two separator members, and the respective manifold apertures of the at least one separator communicate with the corresponding manifold apertures of each of the two separator members.

In still another preferred mode of the conductive separator, the at least one separator further comprises an oxidant gas inlet-side manifold aperture and an oxidant gas outlet-side manifold aperture, the two separator members further comprise an oxidant gas inlet-side manifold aperture and an oxidant gas outlet-side manifold aperture, the cathode-side separator member further comprises: a gas flow channel for supplying the oxidant gas to the cathode which is formed on the cathode-side; and an inlet-side through hole and an outlet-side through hole for oxidant gas penetrating the cathode-side separator member which are formed at an inlet-side end and an outlet-side end of the gas flow channel, the anode-side separator member further comprises: an inlet-side through hole and an outlet-side through hole for oxidant gas communicating with the inlet-side and outlet-side through holes for oxidant gas of the cathode-side separator member; and an inlet-side connection groove and an outlet-side connection groove for connecting the inlet-side and outlet-side through holes for oxidant gas of the anode-side separator member with the oxidant gas inlet-side manifold aperture and the oxidant gas outlet-side manifold aperture, respectively, which are formed on the anode-side, and the respective oxidant gas manifold apertures of the at least one separator communicate with the corresponding oxidant gas manifold apertures of each of the two separator members.

It is preferable that the membrane electrode assembly further comprises a gasket covering an outer periphery of the anode and the cathode, and that the gasket comprises a fuel gas inlet-side manifold aperture, a fuel gas outlet-side manifold aperture, an oxidant gas inlet-side manifold aperture, an oxidant gas outlet-side manifold aperture, a cooling water inlet-side manifold aperture, and a cooling water outlet-side manifold aperture, the respective manifold apertures of the gasket communicating with the corresponding manifold apertures of each of the two separator members.

In the following, embodiments of the present invention will be described with reference to drawings.

Embodiment 1

FIG. 1 is a front view illustrating a membrane electrode assembly (hereinafter referred to as MEA). An MEA 6 comprises a polymer electrolyte membrane, a cathode and an anode sandwiching the electrolyte membrane, and a gasket that is bonded to the periphery of the cathode and anode so as to cover exposed portions of the electrolyte membrane. In FIG. 1, numeral 4 represents an electrode portion, specifically an anode in this case (the backside of the electrode portion 4 is a cathode), and numeral 5 is a gasket portion.

The MEA 6 has, on the periphery thereof, an oxidant gas inlet-side manifold aperture 1a, an oxidant gas outlet-side manifold aperture 1b, a fuel gas inlet-side manifold aperture 2a, a fuel gas outlet-side manifold aperture 2b, a cooling water inlet-side manifold aperture 3a and a cooling water outlet-side manifold aperture 3b.

Figure 2:
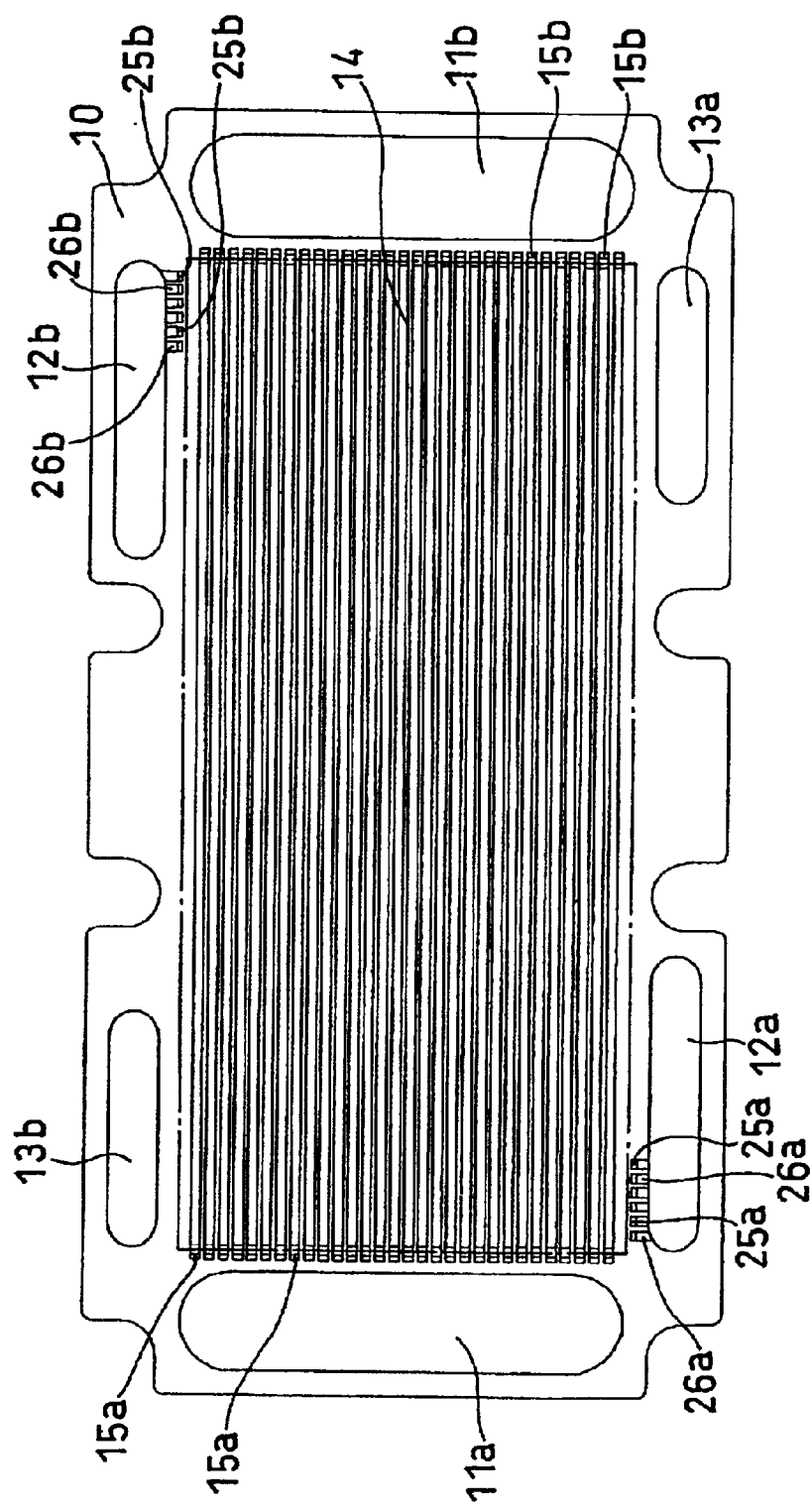
FIG. 2 is a front view illustrating a cathode-side of a conductive separator of a fuel cell in Embodiment 1 of the present invention.
Figure 3:
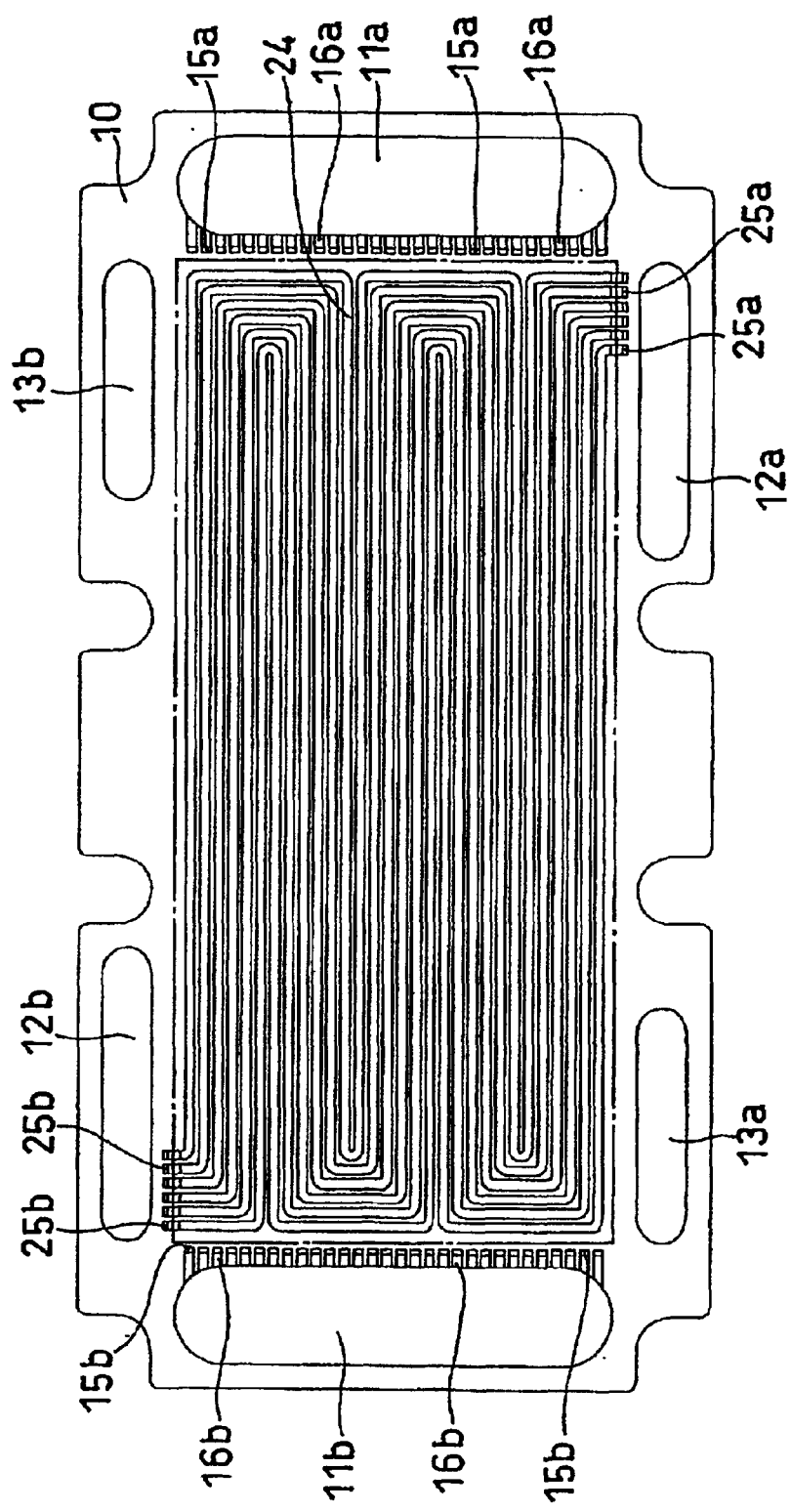
FIG. 3 is a front view illustrating an anode-side of the conductive separator as shown in FIG. 2.

FIGS. 2 and 3 illustrate a conductive separator in accordance with one embodiment of the present invention.

A separator 10 has, on the periphery corresponding to the gasket portion 5 of the MEA 6, an oxidant gas inlet-side manifold aperture 11a, an oxidant gas outlet-side manifold aperture 11b, a fuel gas inlet-side manifold aperture 12a, a fuel gas outlet-side manifold aperture 12b, a cooling water inlet-side manifold aperture 13a, and a cooling water outlet-side manifold aperture 13b.

The separator 10 also has, on a cathode-side, a plurality of gas flow channels 14 which are linear and parallel to each other for supplying an oxidant gas to a cathode and has, on an anode-side, a plurality of parallel gas flow channels 24 for supplying a fuel gas to an anode. The gas flow channels 24 have a serpentine shape that is a combination of straight lines and turns. In FIGS. 2 and 3, the portion inside the dashed line and the portion outside the dashed line are to come in contact with the electrode portion 4 and the gasket portion 5 of the MEA 6, respectively.

The ends of the gas flow channels 14 for oxidant gas are located at portions of the separator 10 to come in contact with the gasket portion 5 and have through holes 15a and 15b. In order to connect the through holes 15a and 15b with the inlet-side manifold aperture 11a and the outlet-side manifold aperture 11b, respectively, connection grooves 16a and 16b are provided on the other side of the separator 10, i.e., on the anode-side of the separator 10.

Similarly, the ends of the gas flow channels 24 for fuel gas are located at portions of the separator 10 to come in contact with the gasket portion 5 and have through holes 25a and 25b. In order to connect the through holes 25a and 25b with the inlet-side manifold aperture 12a and the outlet-side manifold aperture 12b, respectively, connection grooves 26a and 26b are provided on the cathode-side of the separator.

Figure 8:
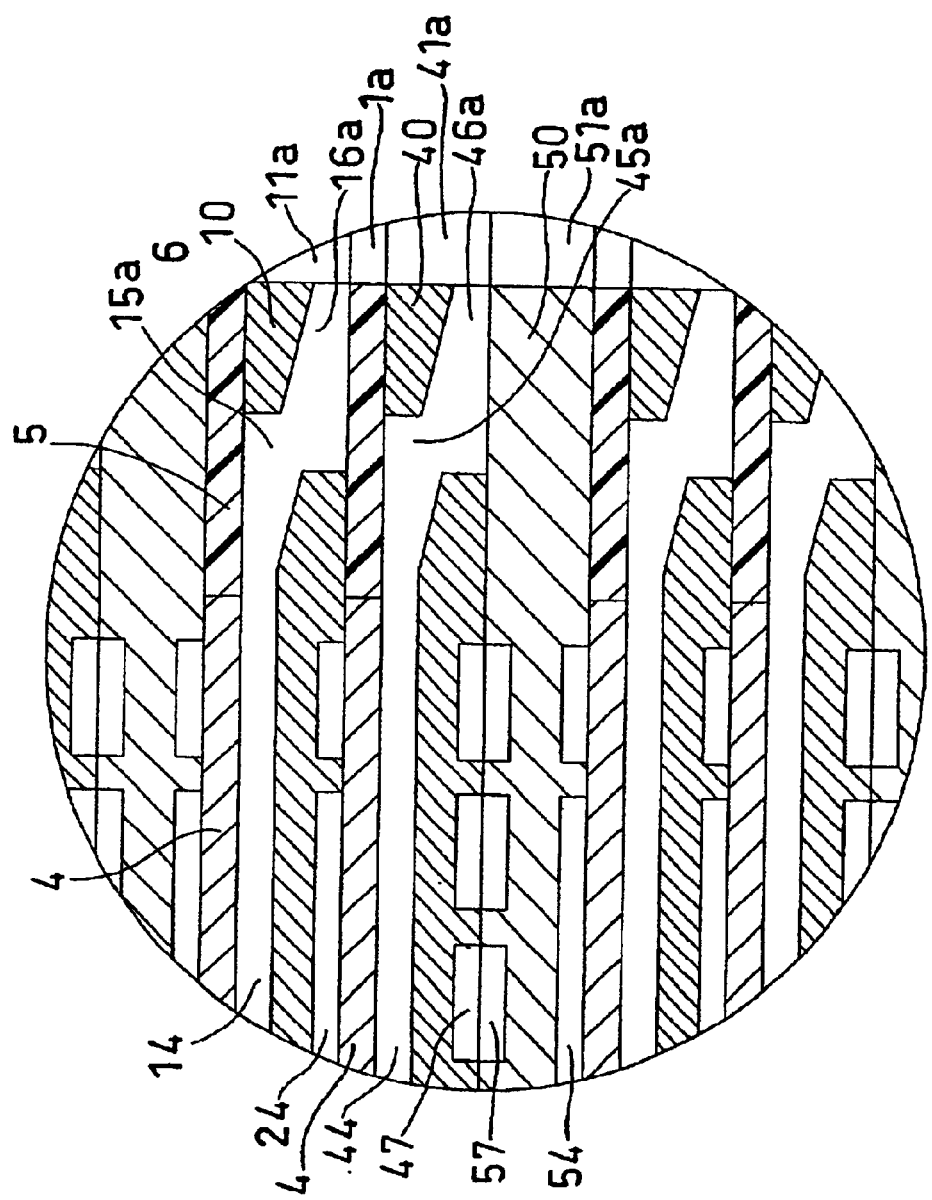
FIG. 8 is a cross-sectional view of the vital part of a cell stack of the fuel cell in Embodiment 1 of the present invention.

FIG. 8 is a cross-sectional view of the vital part of a cell stack in which the MEAs are stacked with the separator 10 interposed therebetween.

The oxidant gas supplied to the inlet-side manifold aperture 11a passes through the connection grooves 16a formed on the anode-side of the separator 10 and the through holes 15a penetrating the separator 10 and reaches the gas flow channels 14 formed on the cathode-side to be supplied to the cathode. An excessive gas and a gas generated by the electrode reaction pass from the gas flow channels 14 through the through holes 15b penetrating the separator 10 and the connection grooves 16b formed on the anode-side and reach the outlet-side manifold aperture 11b to be discharged.

The fuel gas supplied to the inlet-side manifold aperture 12a passes through the connection grooves 26a formed on the cathode-side of the separator 10 and the through holes 25a penetrating the separator 10 and reaches the gas flow channels 24 formed on the anode-side to be supplied to the anode. An excessive gas and a gas generated by the electrode reaction pass from the gas flow channels 24 through the through holes 25b penetrating the separator 10 and the connection grooves 26b formed on the cathode-side and reach the outlet-side manifold aperture 12b to be discharged.

Figure 4:
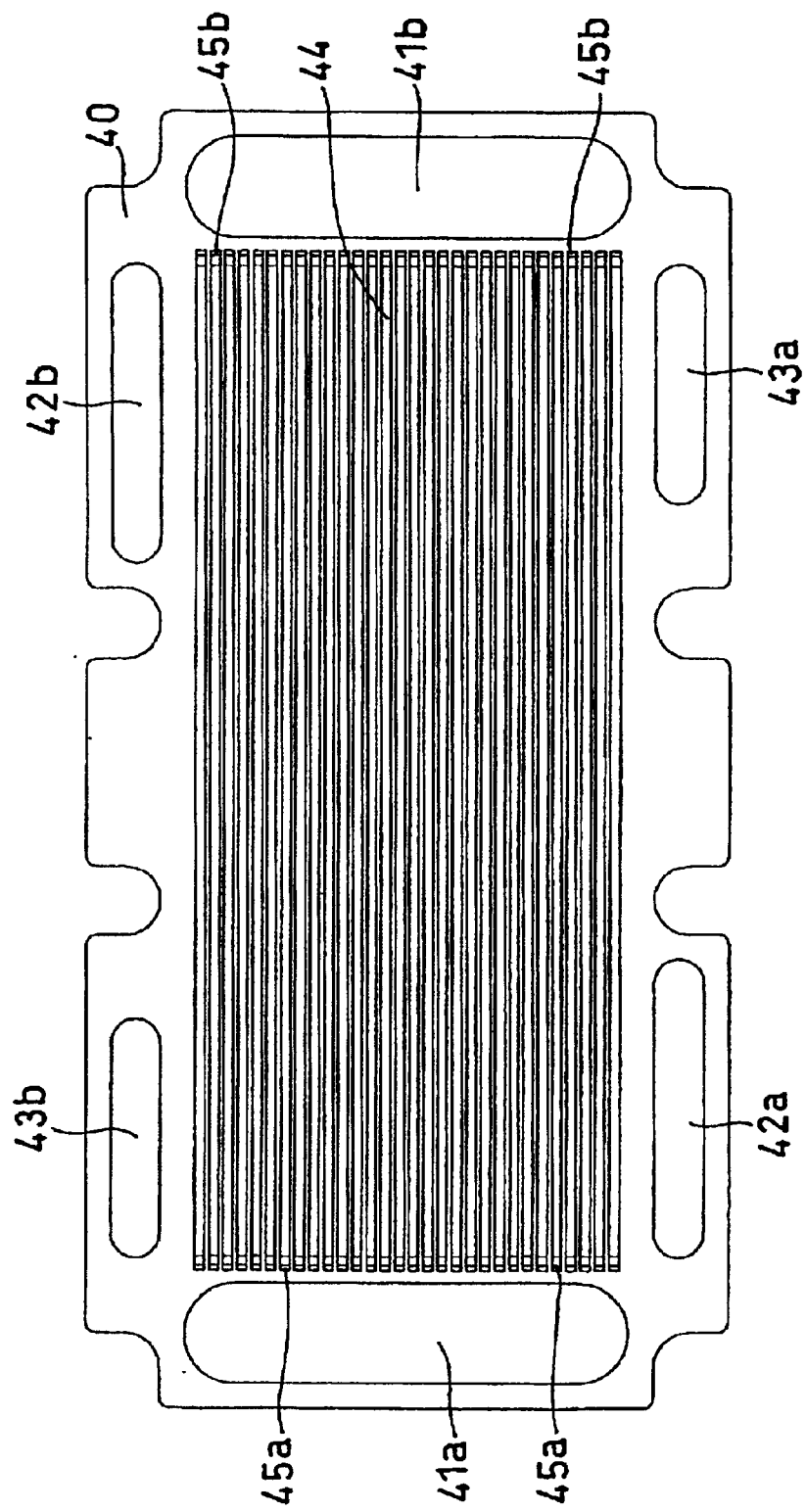
FIG. 4 is a front view illustrating a cathode-side of a cathode-side conductive separator member of the fuel cell in Embodiment 1 of the present invention.
Figure 5:
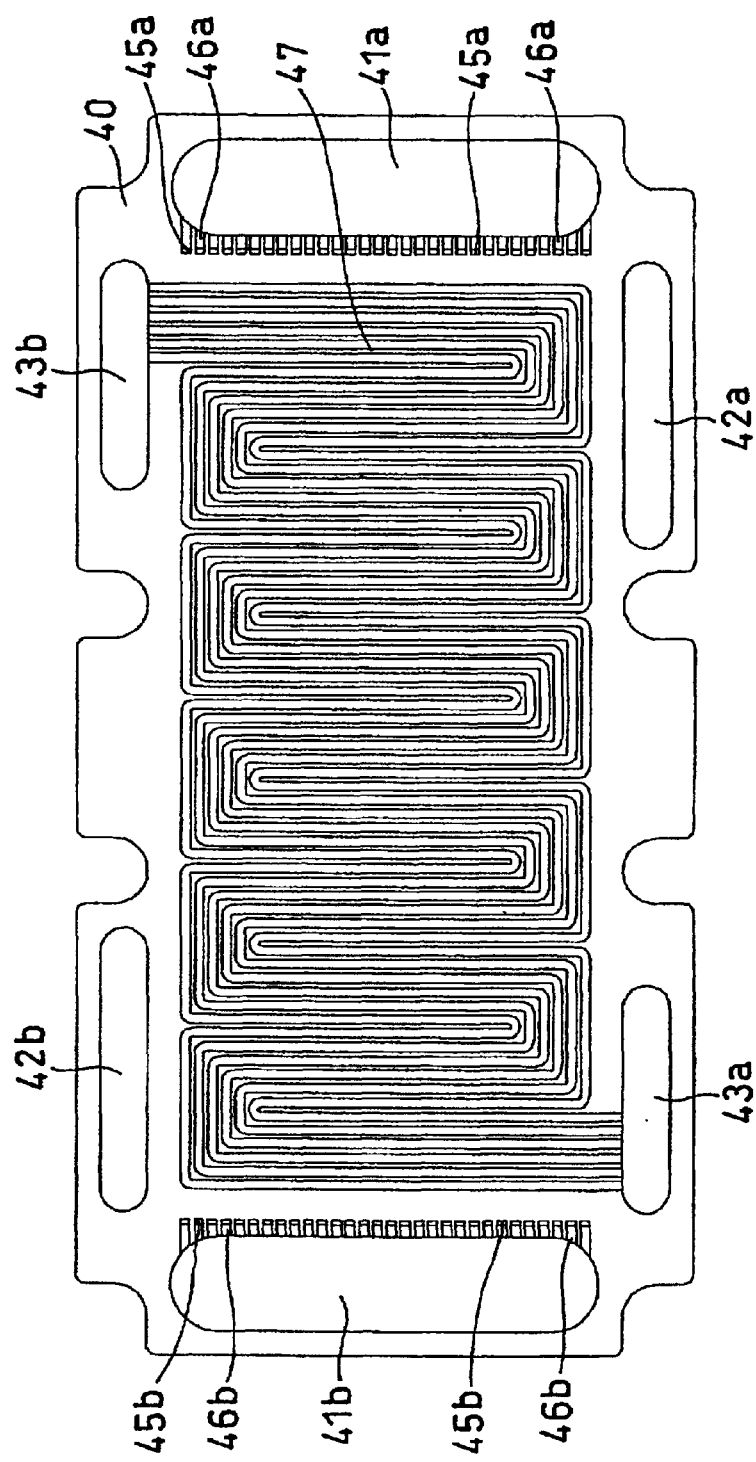
FIG. 5 is a front view illustrating the backside of the cathode-side conductive separator member as shown in FIG. 4.
Figure 6:
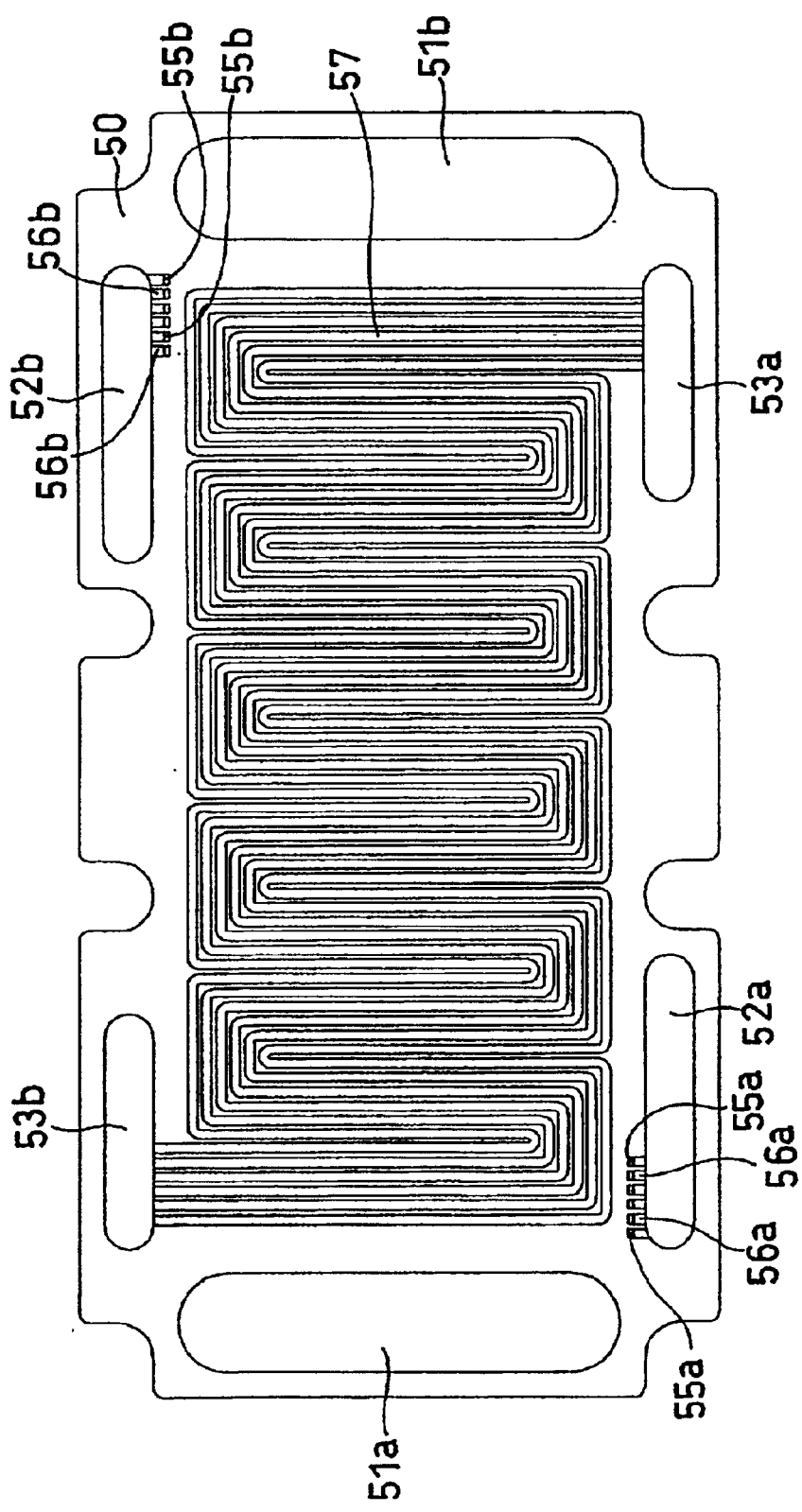
FIG. 6 is a front view illustrating the backside of an anode-side conductive separator member of the fuel cell in Embodiment 1 of the present invention.
Figure 7:
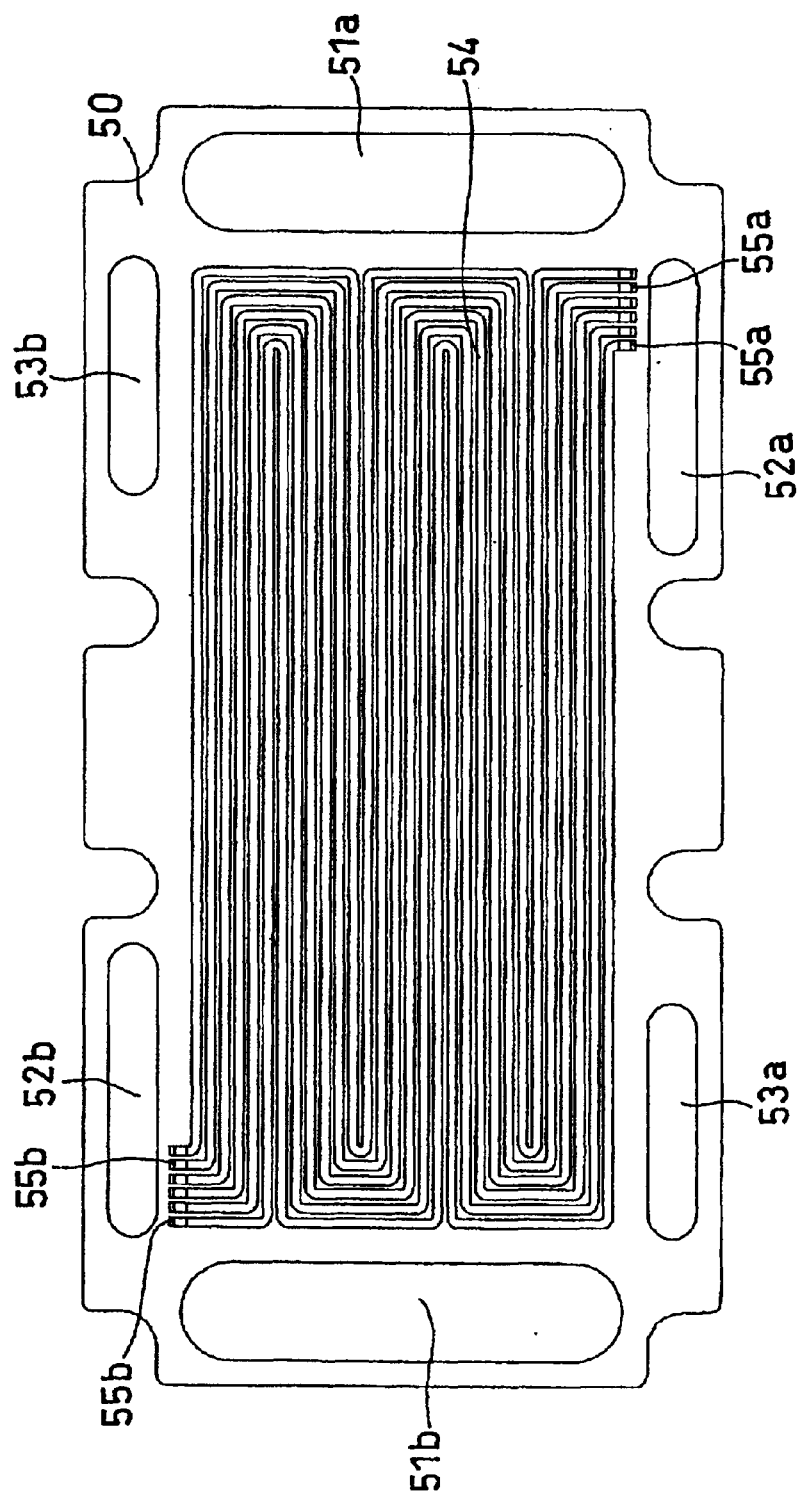
FIG. 7 is a front view illustrating an anode-side of the anode-side conductive separator member as shown in FIG. 6.

FIGS. 4 and 5 illustrate a cathode-side conductive separator member having cooling water flow channels formed on the backside thereof, and FIGS. 6 and 7 illustrate an anode-side conductive separator member having cooling water flow channels formed on the backside thereof.

A cathode-side conductive separator member 40 has an oxidant gas inlet-side manifold aperture 41a, an oxidant gas outlet-side manifold aperture 41b, a fuel gas inlet-side manifold aperture 42a, a fuel gas outlet-side manifold aperture 42b, a cooling water inlet-side manifold aperture 43a, and a cooling water outlet-side manifold aperture 43b.

The separator member 40 also has, on a cathode-side thereof, a plurality of gas flow channels 44 for oxidant gas, and has through holes 45a and 45b formed at the ends of the gas flow channels 44. In order to connect the through holes 45a and 45b with the inlet-side manifold aperture 41a and the outlet-side manifold aperture 41b, respectively, connection grooves 46a and 46b are provided on the backside of the separator member 40.

The structure of the separator member 40 is the same as that of the separator 10 except that the separator member 40 has cooling water flow channels 47, of which ends directly communicate with the inlet-side manifold aperture 43a and the outlet-side manifold aperture 43b, instead of the gas flow channels for fuel gas.

An anode-side conductive separator member 50 has an oxidant gas inlet-side manifold aperture 51a, an oxidant gas outlet-side manifold aperture 51b, a fuel gas inlet-side manifold aperture 52a, a fuel gas outlet-side manifold aperture 52b, a cooling water inlet-side manifold aperture 53a, and a cooling water outlet-side manifold aperture 53b.

The anode-side conductive separator member 50 has, on an anode side thereof, a plurality of gas flow channels 54 for fuel gas, and has through holes 55a and 55b formed at the ends of the gas flow channels 54. In order to connect the through holes 55a and 55b with the inlet-side manifold aperture 52a and the outlet-side manifold aperture 52b, respectively, connection grooves 56a and 56b are provided on the backside of the separator member 50.

The separator member 50 also has, on the backside thereof, cooling water flow channels 57, of which ends directly communicate with the inlet-side manifold aperture 53a and the outlet-side manifold aperture 53b.

The cathode-side separator member 40 and the anode-side separator member 50, combined to each other with their backsides having the cooling water flow channels 47 and 57 in contact with each other, are inserted between the MEAs. FIG. 8 is a cross-sectional view of a cell stack in which the combination of the cathode-side separator member 40 and anode-side separator member 50 is alternately inserted with the separator 10 between the MEAs.

The oxidant gas supplied to the inlet-side manifold apertures 41a and 51a passes through the connection grooves 46a formed on the backside of the cathode-side separator member 40 and the through holes 45a and reaches the gas flow channels 44 to be supplied to the cathode. An excessive gas and a generated gas pass from the gas flow channels 44 through the through holes 45b and the connection grooves 46b and reach the outlet-side manifold aperture 41b to be discharged.

Similarly, the fuel gas supplied to the inlet-side manifold aperture 42a and 52a passes through the connection grooves 56a formed on the backside of the anode-side separator member 50 and the through holes 55a and reaches the gas flow channels 54 to be supplied to the anode. An excessive gas and a generated gas pass from the gas flow channels 54 through the through holes 55b and the connection grooves 56b and reach the outlet-side manifold aperture 52b to be discharged.

The cooling water supplied to the inlet-side manifold apertures 43a and 53a passes through the serpentine cooling water flow channels 47 and 57 and is discharged from the outlet-side manifold apertures 43b and 53b. In this manner, the cooling water cools fuel cells from the backsides of the cathode-side separator member 40 and anode-side separator member 50.

For cooling the cells, water is generally and conveniently used, but an antifreezing solution such as ethylene glycol may be used.

Figure 14:
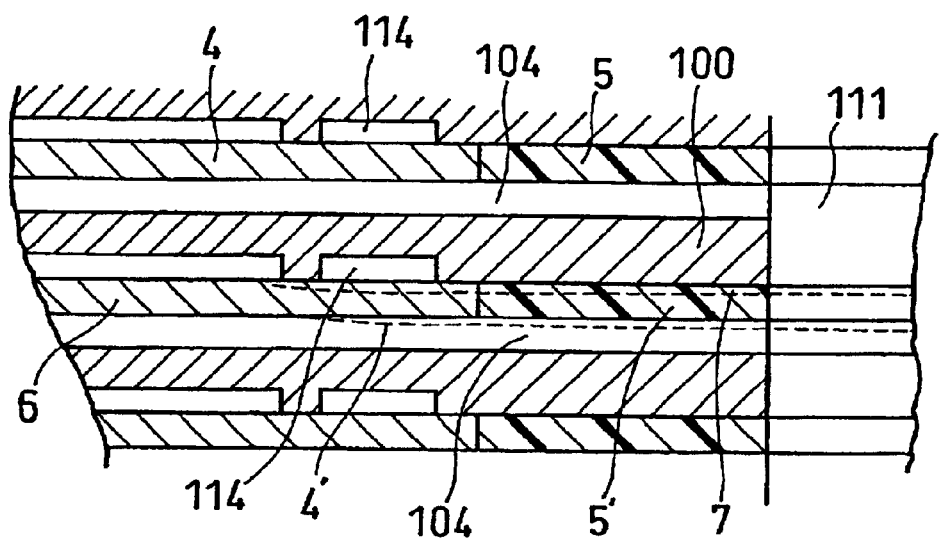
FIG. 14 is a cross-sectional view of the vital part of a cell stack of a prior art fuel cell comprising conventional separators.

FIG. 14 is a cross-sectional view of the vital part of a cell stack comprising conventional separators 100. The separator 100 has, on a cathode side thereof, a gas flow channel for oxidant gas 104 communicating with an oxidant gas manifold aperture 111 and has, on an anode side thereof, a gas flow channel for fuel gas 114 communicating with a fuel gas manifold aperture. When the cell stack is clamped in the stacking direction of unit cells, a gasket 5 of an MEA 6 may be pressed to fall into the channel 104 in the vicinity of the manifold aperture 111 due to the clamping pressure. In this case, the gasket 5 and an adjoining portion of an electrode portion 4 become deformed toward the channel 104 as shown by the dotted line of FIG. 14, thereby creating a clearance 7 on the anode side between the deformed electrode portion 4' and gasket 5' and the adjoining separator 100. In the event that the clearance 7 communicates with the gas flow channel for fuel gas 114, the fuel gas is mixed with the oxidant gas from the manifold aperture 111.

To the contrary, in the present invention, the gas flow channel for oxidant gas 14 of the separator 10 communicates with the manifold aperture 11a through the through hole 15a and the connection groove 16a formed on the anode-side, as shown in FIG. 8. Even if the MEA is pressed down into the gas flow channel 14, the gasket 5 of the MEA is received by the portion of the separator 10 without any channel or groove between the through hole 15a and the manifold aperture 11a. Thus, the gasket 55 does not fall into the gas flow channel for oxidant gas 14 on the cathode side of the separator 10 in the vicinity of the manifold aperture 11a, so that such a clearance as to connect the gas flow channel for fuel gas 24 with the oxidant gas manifold aperture 11a is not created on the anode side between the gasket and the adjoining separator. Further, if another gasket falls into the adjoining connection groove 16a communicating with the oxidant gas manifold aperture 11a to form a clearance on the cathode side between the gasket and the adjoining separator member 40, the clearance communicates with the oxidant gas manifold aperture or gas flow channel for oxidant gas, so that no mixing of the oxidant gas with the fuel gas occurs.

Although the above paragraph described the case of the gasket falling into the oxidant gas channel, the present invention causes no mixing of the oxidant gas with the fuel gas also in the case of the gasket falling into the fuel gas channel.

Embodiment 2

The following will describe another embodiment of the cathode-side and anode-side separator members with cooling water flow channels.

Figure 9:
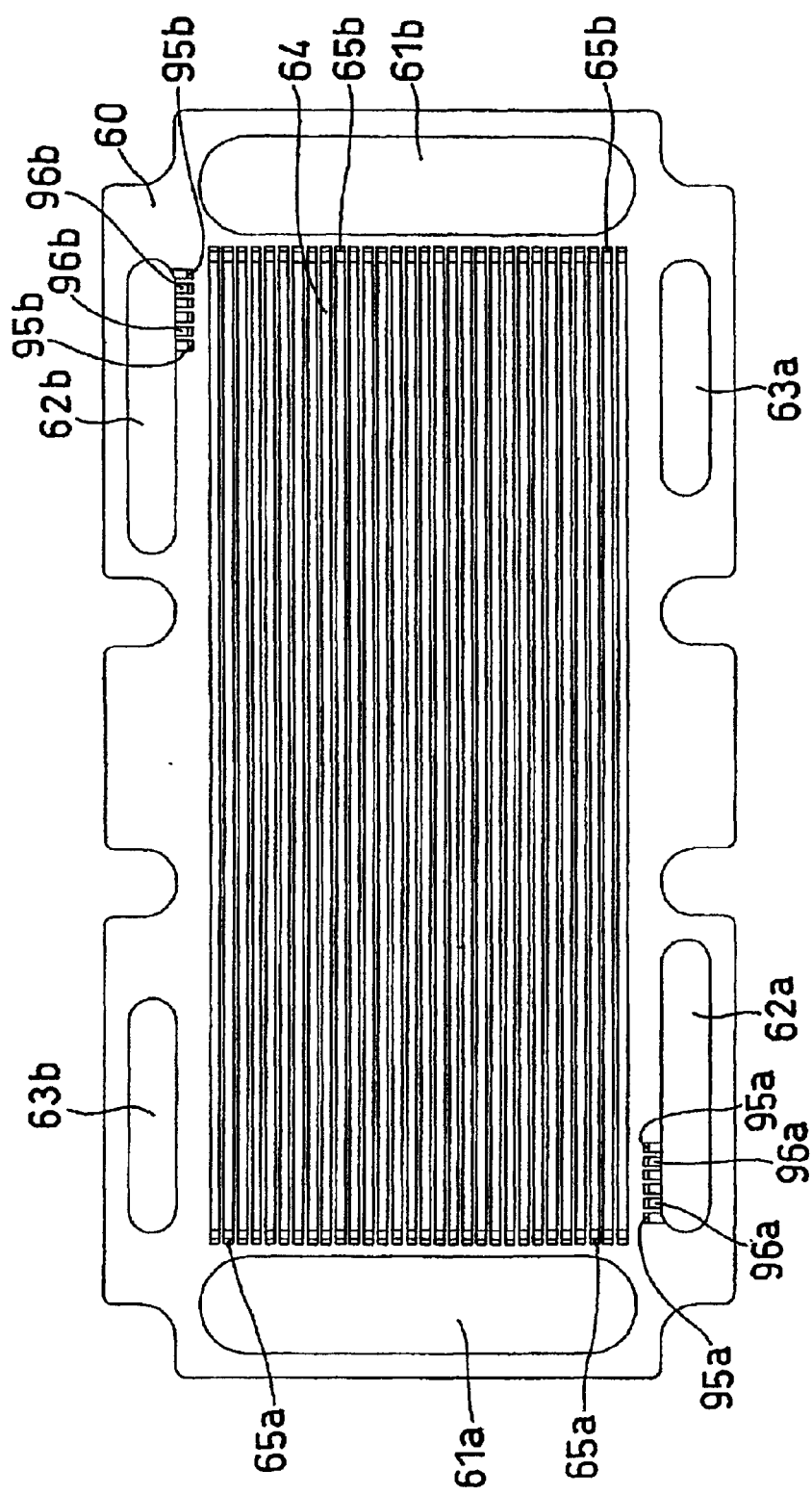
FIG. 9 is a front view illustrating a cathode-side of a cathode-side conductive separator member of a fuel cell in Embodiment 2 of the present invention.
Figure 10:
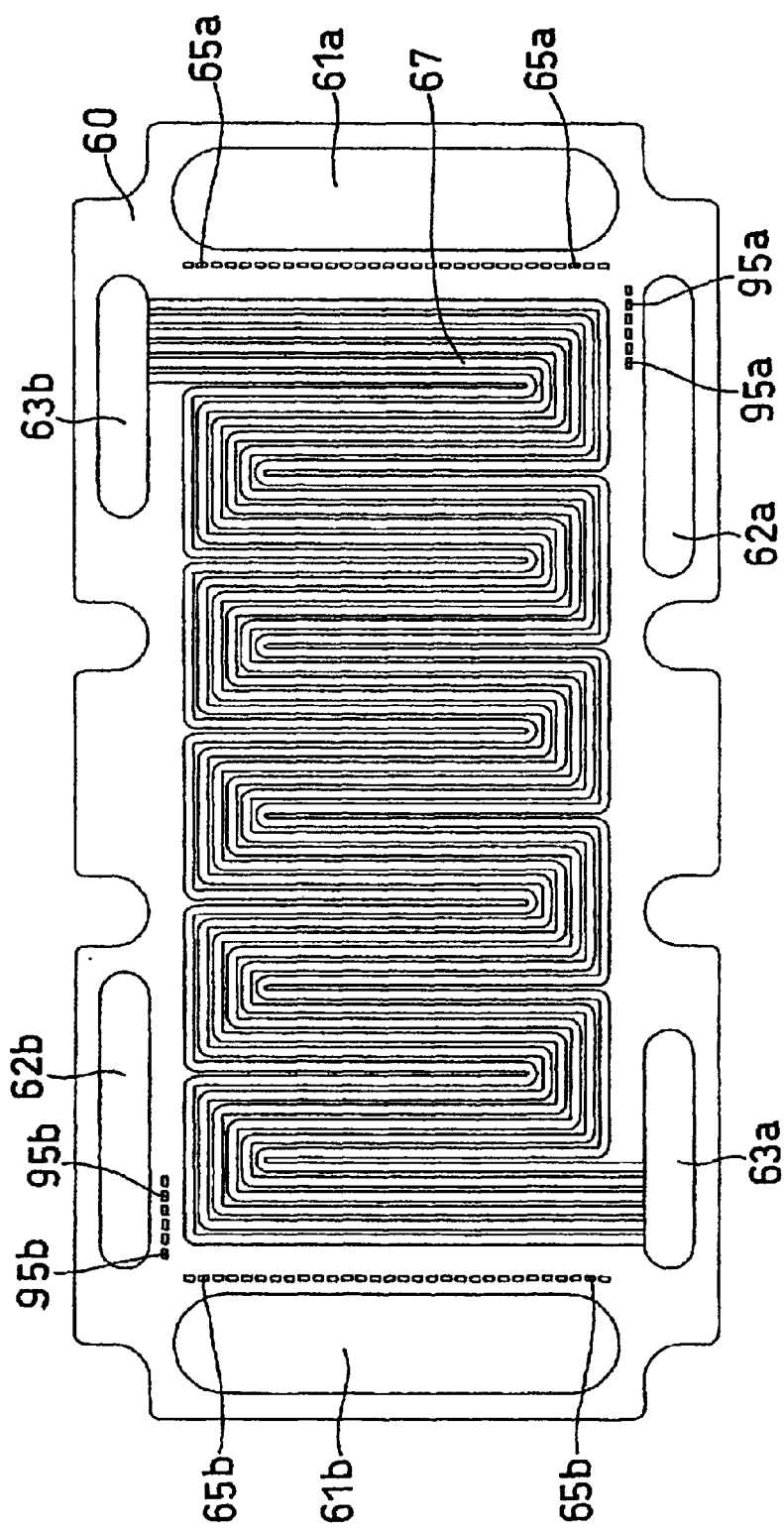
FIG. 10 is a front view illustrating the backside of the cathode-side conductive separator member as shown in FIG. 9.
Figure 11:
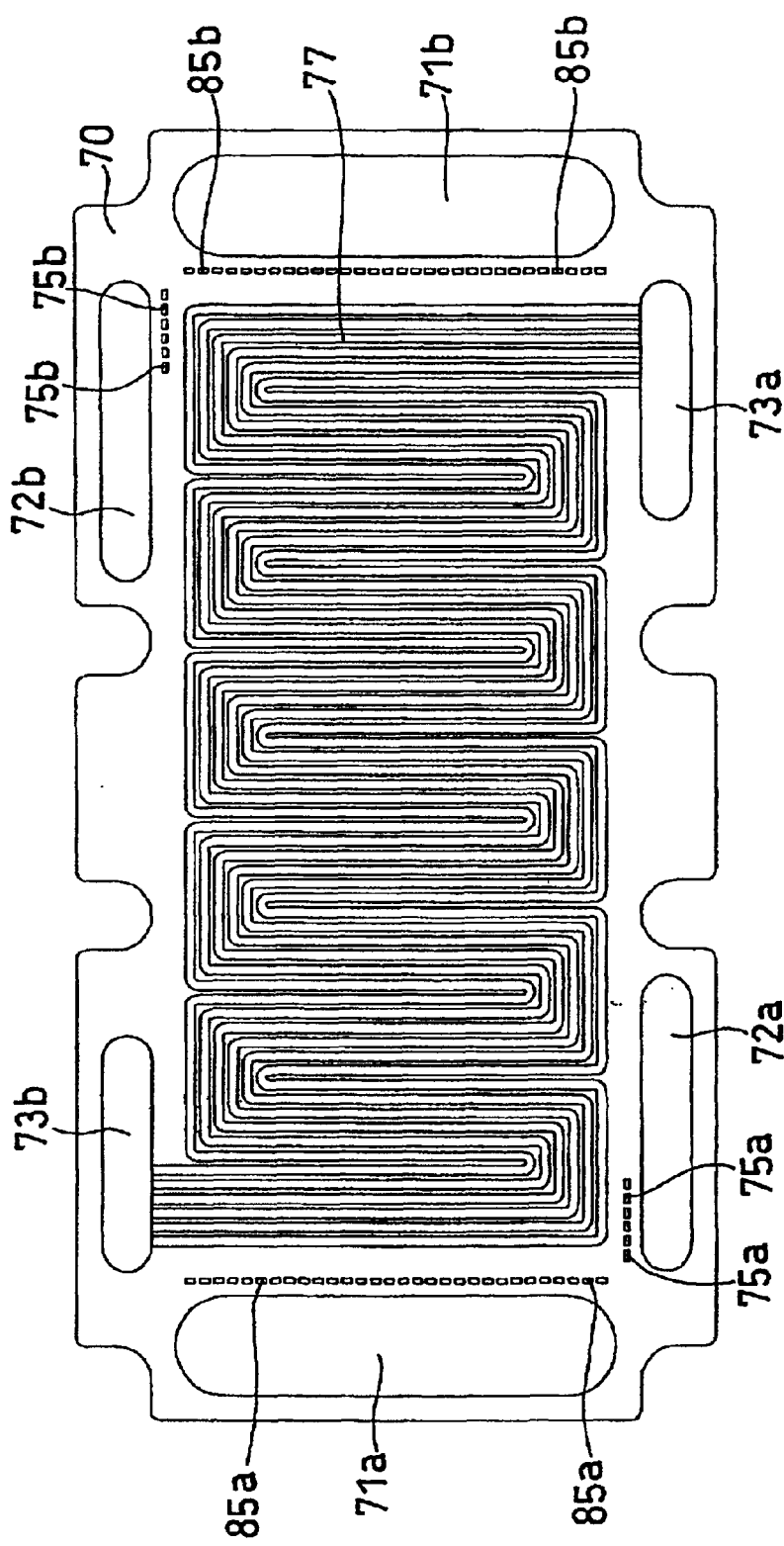
FIG. 11 is a front view illustrating the backside of an anode-side conductive separator member of the fuel cell in Embodiment 2 of the present invention.
Figure 12:
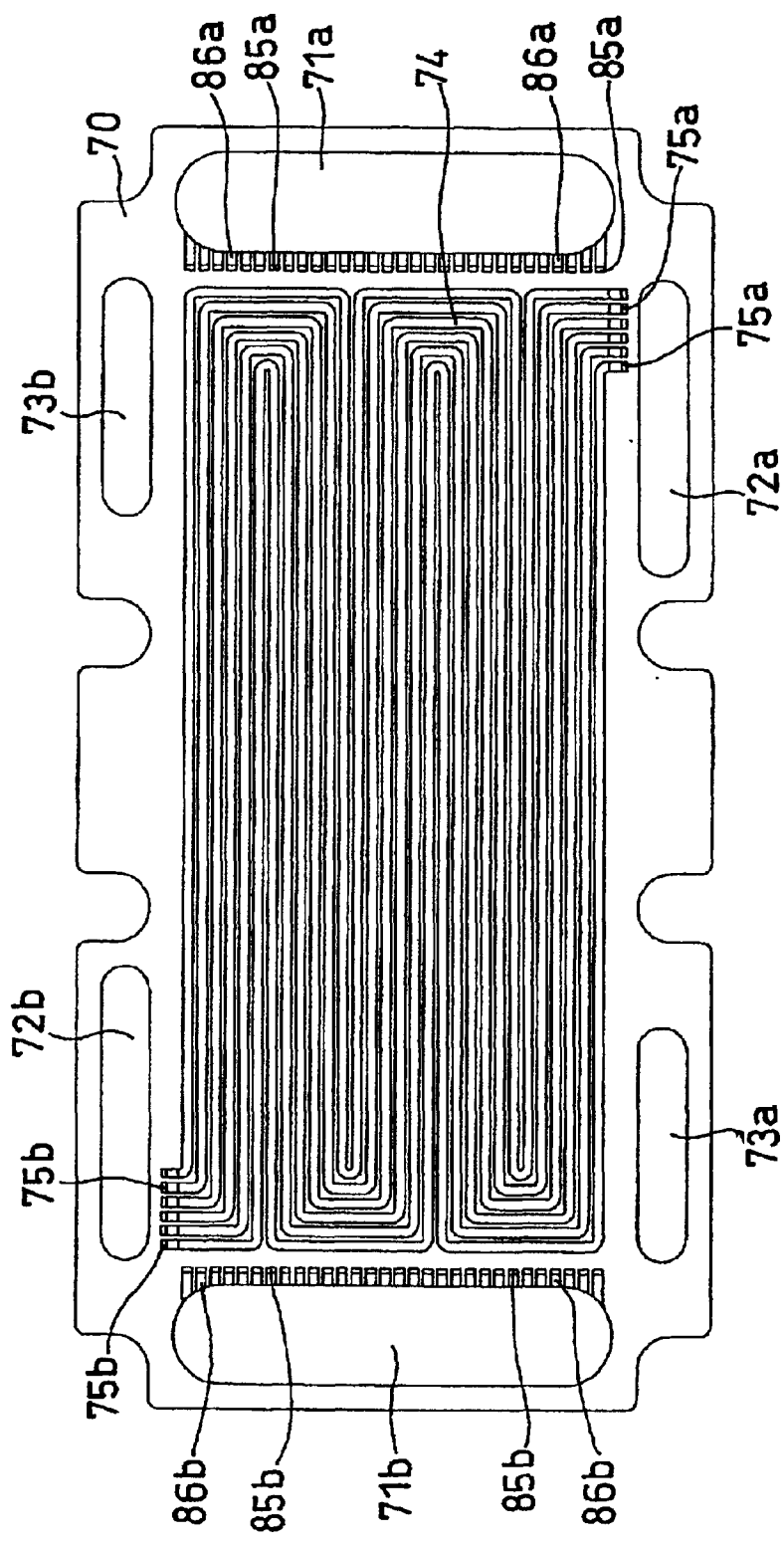
FIG. 12 is a front view illustrating an anode-side of the anode-side conductive separator member as shown in FIG. 11.

FIGS. 9 and 10 illustrate a cathode-side conductive separator member having cooling water flow channels formed on the backside thereof, and FIGS. 11 and 12 illustrate an anode-side conductive separator member having cooling water flow channels formed on the backside thereof.

A cathode-side conductive separator member 60 has an oxidant gas inlet-side manifold aperture 61a, an oxidant gas outlet-side manifold aperture 61b, a fuel gas inlet-side manifold aperture 62a, a fuel gas outlet-side manifold aperture 62b, a cooling water inlet-side manifold aperture 63a, and a cooling water outlet-side manifold aperture 63b.

The separator member 60 also has, on a cathode side thereof, a plurality of gas flow channels 64 for oxidant gas, and has through holes 65a and 65b formed at the ends of the gas flow channels 64. The separator member 60 further has through holes 95a and 95b for fuel gas communicating with through holes for fuel gas 75a and 75b, respectively, of an anode-side separator member 70 that will be described later. In order to connect the through holes 95a and 95b for fuel gas with the fuel gas inlet-side manifold aperture 62a and the fuel gas outlet-side manifold aperture 62b, respectively, the separator member 60 still further has connection grooves for fuel gas 96a and 96b on the cathode-side.

The separator member 60 has, on the backside thereof, serpentine cooling water flow channels 67, of which inlet-side end and outlet-side end communicate with the inlet-side manifold aperture 63a and the outlet-side manifold aperture 63b, respectively.

An anode-side conductive separator member 70 has an oxidant gas inlet-side manifold aperture 71a, an oxidant gas outlet-side manifold aperture 71b, a fuel gas inlet-side manifold aperture 72a, a fuel gas outlet-side manifold aperture 72b, a cooling water inlet-side manifold aperture 73a, and a cooling water outlet-side manifold aperture 73b.

The anode-side conductive separator member 70 also has, on an anode side thereof, a plurality of gas flow channels 74 for fuel gas, and has through holes for fuel gal 75a and 75b formed at the ends of the gas flow channels 74. The separator member 70 further has through holes for oxidant gas 85a and 85b communicating with the through holes for oxidant gas 65a and 65b, respectively, of the cathode-side separator member 60. In order to connect the through holes for oxidant gas 85a and 85b with the oxidant gas inlet-side manifold aperture 71a and the oxidant gas outlet-side manifold aperture 71b, respectively, the separator member 70 still further has connection grooves for oxidant gas 86a and 86b on the anode side.

The separator member 70 has, on the backside thereof, serpentine cooling water flow channels 77, of which inlet-side end and outlet-side end communicate with the inlet-side manifold aperture 73a and the outlet-side manifold aperture 73b, respectively.

Figure 13:
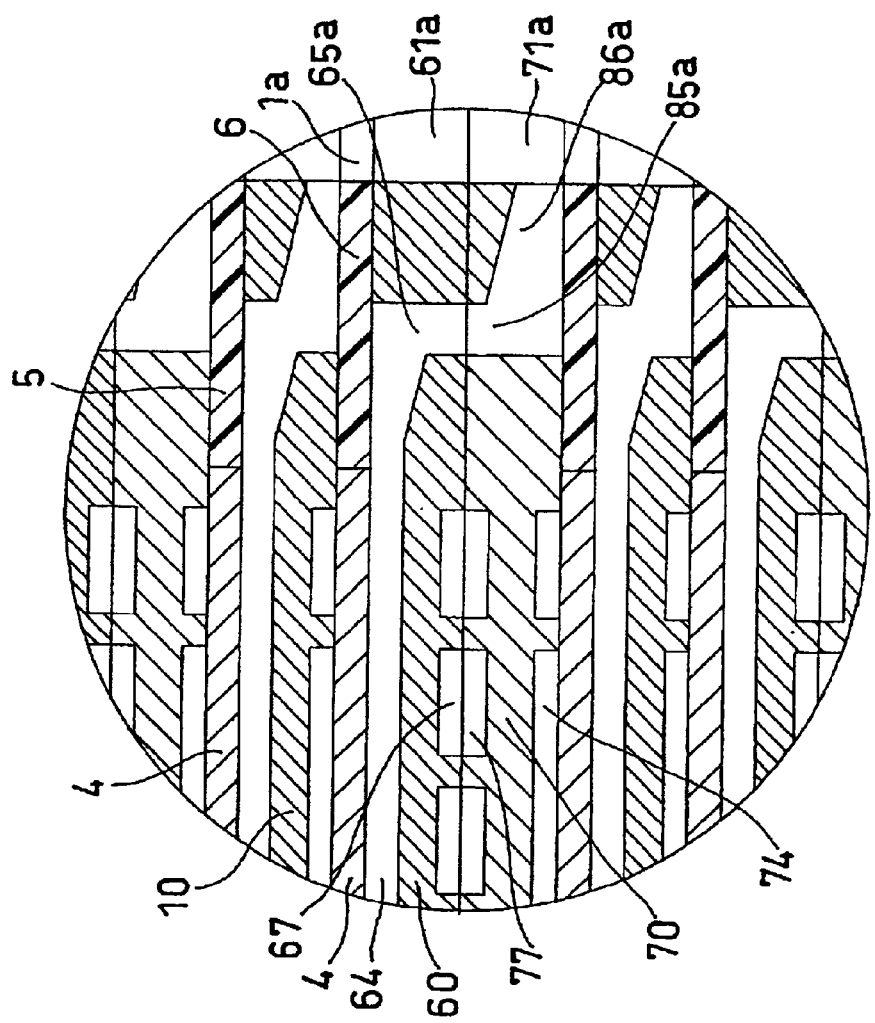
FIG. 13 is a cross-sectional view of the vital part of a cell stack of the fuel cell in Embodiment 2 of the present invention.

The cathode-side separator member 60 and the anode-side separator member 70, combined to each other with their backsides having the cooling water flow channels 67 and 77 in contact with each other, are inserted between the MEAS. FIG. 13 is a cross-sectional view of a cell stack in which the combination of the cathode-side separator member 60 and anode-side separator member 70 is alternately inserted with the separator 10 between the MEAs.

The oxidant gas supplied to the inlet-side manifold apertures 61a and 71a passes through the connection grooves 86a formed on the anode-side of the anode-side separator member 70 and the through holes 85a and 65a and reaches the gas flow channels 64 to be supplied to the cathode. An excessive gas and a generated gas pass from the gas flow channels 64 through the through holes 65b and 85b and the connection grooves 86b and reach the outlet-side manifold aperture 71b to be discharged.

Similarly, the fuel gas supplied to the inlet-side manifold aperture 62a of the cathode-side separator member 60 passes through the connection grooves 96a and the through holes 95a and 75a and reaches the gas flow channels 74 formed on the anode-side of the anode-side separator member 70 to be supplied to the anode. An excessive gas and a generated gas pass from the gas flow channels 74 through the through holes 75b and 95b and the connection grooves 96b and reach the outlet-side manifold aperture 62b to be discharged.

The cooling water supplied to the inlet-side manifold apertures 63a and 73a passes through the serpentine cooling water channels 67 and 77 and is discharged from the outlet-side manifold apertures 63b and 73b. In this manner, the cooling water cools fuel cells from the backsides of the cathode-side separator member 60 and anode-side separator member 70.

As in the foregoing embodiment, it is clear that a cross leak of the fuel gas and the oxidant gas does not occur also in this embodiment using the combination of the cathode-side separator member 60 and anode-side separator member 70 for forming cooling water flow channels.

Although the cooling water flow channels were formed on opposing sides of two separator members in the foregoing embodiments, they may be formed only on one separator member.

As described above, in a fuel cell in which conductive separators and MEAs are laminated, the present invention can prevent a cross leak of two different gases from occurring at edges of the contacting portion of the conductive separator and the gasket of the MEA in the vicinity of a manifold aperture.

In the above-described embodiments, a plurality of parallel gas flow channels for supplying the oxidant gas or the fuel gas were formed, but just one gas flow channel may be formed. Similarly, this applies to the number of cooling water flow channel. In the case of one gas flow channel, the number of inlet-side through hole, outlet-side through hole, inlet-side connection groove and outlet-side connection groove may be just one.

In the embodiments, one gasket covered both sides of the electrolyte membrane exposed to outside, but two gaskets may be used to cover each side of the electrolyte membrane exposed to outside.

In the following, examples of the present invention will be described.

EXAMPLE 1

A conductive carbon powder having an average particle size of 30 nm (Ketgenblack EC, manufactured by Akzochimie in Holland) was allowed to carry platinum particles having an average particle size of about 30 Å in a weight ratio of 75:25, which gave an electrode catalyst powder. A dispersion of this catalyst powder in isopropanol was mixed with a dispersion of perfluorocarbon sulfonic acid powder in ethyl alcohol represented by the following chemical formula to prepare a paste. This paste was printed on one side of a 250 μm thick carbon fiber nonwoven fabric by screen printing to form an electrode catalyst layer. The electrode catalyst layer was formed so as to contain 0.5 mg/cm² platinum and 1.2 mg/cm² perfluorocarbon sulfonic acid. In this manner, by forming the catalyst layer on the carbon fiber non-woven fabric serving as a diffusion layer, cathodes and anodes having the same structure were produced.

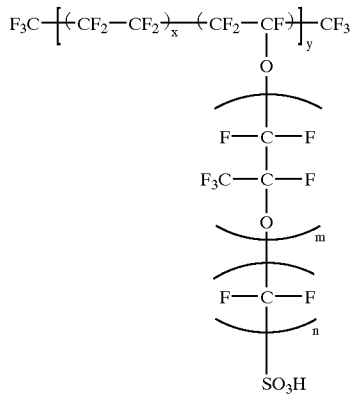

wherein m = 1, n = 2, x = 5 to 13.5, and 4 ≈ 1000.

A cathode and an anode thus produced were bonded, by hot pressing, to both sides of the center part of a hydrogen-ion conductive polymer electrolyte membrane having an area slightly larger than that of the electrode in such a manner that each of the printed catalyst layers of the electrodes was in contact with the electrolyte membrane. This gave an MEA (membrane electrode assembly). The proton conductive polymer electrolyte membrane used in this example was a 25 μm thick thin film of perfluorocarbon sulfonic acid represented by the above-mentioned chemical formula wherein m=2 in this case. The structure of this MEA is shown in FIG. 1, in which numeral 6 represents the MEA, numeral 4 the electrode portion, and numeral 5 the gasket portion arranged on the outer periphery of the electrode portion 4.

In this example, a polymer electrolyte fuel cell as shown in FIG. 8 was assembled using the separators 10, 40 and 50 as shown in FIGS. 2 to 7.

These separators were produced by processing a plate of isotropic graphite having a thickness of 2 mm, a height of 130 mm and a width of 260 mm with the following specifications. The gas flow channels for oxidant gas 14 and 44 were formed to have a width of about 2 mm and a pitch of 2.9 mm in a 20 cm×9 cm area at the center of a cathode-side of the graphite plate. Similarly, the gas flow channels for fuel gas 24 and 54 were formed to have a serpentine shape with the same width and pitch on an anode-side of the plate. The cooling water flow channels 47 and 57 were produced to have a width of about 2 mm and a pitch of 2.9 mm.

In the separator 10, the cathode-side gas flow channels 14 and anode-side gas flow channels 24 were formed with their center lines of the linear part exactly corresponding to each other, in order to prevent excessive shearing force from being applied to the electrodes. Also, the combination of the separator members 40 and 50 was inserted every two unit cells to provide the polymer electrolyte fuel cell with cooling sections for flowing cooling water therein. For forming the cooling sections, two kinds of the separator members 40 and 50 having cooling water flow channels were bonded to each other with a sealant (#1211, Liquid Gasket of Solventless Silicon & Sag Type, manufactured by Three Bond Co., Ltd) in such a manner that their sides having the cooling water flow channels faced each other. With regard to the gas tightness, the gasket bonded to the MEA was used to air-tightly seal the combination of the separator and the MEA, while the sealant, #1211, was used to air-tightly seal the combination of two separator members.

The MEAs thus produced were stacked with the above-described separators interposed therebetween to form a stack of 50 cells, and the resultant cell stack was clamped with current collector plates, insulating plates and stainless steel end plates, using clamping rods with a pressure of 10 kgf/cm².

While the resultant polymer electrolyte fuel cell of this example was held at 85° C., a hydrogen gas humidified and heated to have a dew point of 83° C. was supplied to the anode and air humidified and heated to have a dew point of 78° C. was supplied to the cathode. Table 1 shows the results of cell examination. Changes in cell voltage with a current of 36A, 90A and 126A are shown in Table 1, indicating that the polymer electrolyte fuel cell of this example is practically effective although the deterioration of the voltage increases with increasing current.

TABLE 1

| | Operating time (hour) | | | |
|---|---|---|---|---|
| Current (A) | 10 | 1000 | 2000 | 3000 |
| 36 | 36 V | 33 V | 32 V | 31 V |
| 90 | 34 V | 31 V | 29 V | 27 V |
| 126 | 31 V | 27 V | 26 V | 25 V |

EXAMPLE 2

In this example, a polymer electrolyte fuel cell was assembled in the same manner as in Example 1 except for the use of the combination of the separator members 60 and 70 for forming cooling water flow channels. While this polymer electrolyte fuel cell was held at 75° C., a hydrogen gas humidified and heated to have a dew point of 70° C. was supplied to the anode and air humidified and heated to have a dew point of 65° C. was supplied to the cathode. The results indicate that the fuel cell of this example has almost the same performance as that of Example 1.

As described above, in a fuel cell in which conductive separators and MEAs are laminated, the present invention can prevent a cross leak of two different gases from occurring at edges of the contacting portion of the conductive separator and the gasket of the MEA in the vicinity of a manifold aperture.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising:
   a fuel cell stack comprising a plurality of conductive separators and a plurality of membrane electrode assemblies that are stacked with one of said conductive separators interposed there between, each of said membrane electrode assemblies comprising a polymer electrolyte membrane, and an anode and a cathode sandwiching said polymer electrolyte membrane;
   a means for supplying a fuel gas to said anode; and
   a means for supplying an oxidant gas to said cathode,
   wherein said plurality of conductive separators comprise at least one separator comprising: a fuel gas inlet-side manifold aperture; a fuel gas outlet-side manifold aperture; a gas flow channel for supplying the fuel gas to said anode which is formed on an anode-side of the separator; an inlet-side through hole and an outlet-side through hole penetrating the separator which are formed at an inlet-side end and an outlet-side end of said gas flow channel for fuel gas; and an inlet-side connection groove and an outlet-side connection groove for connecting said inlet-side and outlet-side through holes with said fuel gas inlet-side manifold aperture and said fuel gas outlet-side manifold aperture, respectively, which are formed on a cathode-side of the separator.

2. The polymer electrolyte fuel cell in accordance with claim 1, wherein said at least one separator further comprises: an oxidant gas inlet-side manifold aperture; an oxidant gas outlet-side manifold aperture; a gas flow channel for supplying the oxidant gas to said cathode which is formed on said cathode-side; an inlet-side through hole and an outlet-side through hole penetrating the separator which are formed at an inlet-side end and an outlet-side end of said gas flow channel for oxidant gas; and an inlet-side connection groove and an outlet-side connection groove for connecting said inlet-side and outlet-side through holes with said oxidant gas inlet-side manifold aperture and said oxidant gas outlet-side manifold aperture, respectively, which are formed on said anode-side.

3. The polymer electrolyte fuel cell in accordance with claim 1,
   wherein said at least one separator further comprises a cooling water inlet-side manifold aperture and a cooling water outlet-side manifold aperture,
   said plurality of conductive separators comprise a combination of two separator members consisting of an anode-side separator member and a cathode-side separator member, each separator member comprising at least a fuel gas inlet-side manifold aperture, a fuel gas outlet-side manifold aperture, a cooling water inlet-side manifold aperture, and a cooling water outlet-side manifold aperture, said two separator members being combined in such a manner that their backsides are in contact with each other,
   said anode-side separator member further comprises: a gas flow channel for supplying the fuel gas to said anode which is formed on an anode-side of the anode-side separator member; an inlet-side through hole and an outlet-side through hole penetrating the anode-side separator member which are formed at an inlet-side end and an outlet-side end of said gas flow channel; and an inlet-side connection groove and an outlet-side connection groove for connecting said inlet-side and outlet-side through holes with said fuel gas inlet-side manifold aperture and said fuel gas outlet-side manifold aperture, respectively, which are formed on the backside of the anode-side separator member,
   at least one of said two separator members has, on the backside thereof, a cooling water flow channel communicating with said cooling water inlet-side manifold aperture and said cooling water outlet-side manifold aperture such that the cooling water flow channel is formed between said two separator members, and
   said respective manifold apertures of said at least one separator communicate with said corresponding manifold apertures of each of said two separator members.

4. The polymer electrolyte fuel cell in accordance with claim 3,
   wherein said at least one separator further comprises an oxidant gas inlet-side manifold aperture and an oxidant gas outlet-side manifold aperture,
   said two separator members further comprise an oxidant gas inlet-side manifold aperture and an oxidant gas outlet-side manifold aperture,
   said cathode-side separator member further comprises: a gas flow channel for supplying the oxidant gas to said cathode which is formed on a cathode-side of the cathode-side separator member; an inlet-side through hole and an outlet-side through hole penetrating the cathode-side separator member which are formed at an inlet-side end and an outlet-side end of said gas flow channel; and an inlet-side connection groove and an outlet-side connection groove for connecting said inlet-side and outlet-side through holes with said oxidant gas inlet-side manifold aperture and said oxidant gas outlet-side manifold aperture, respectively, which are formed on the backside of the cathode-side separator member, and
   said respective oxidant gas manifold apertures of said at least one separator communicate with said corresponding oxidant gas manifold apertures of each of said two separator members.

5. The polymer electrolyte fuel cell in accordance with claim 1,
   wherein said at least one separator further comprises a cooling water inlet-side manifold aperture and a cooling water outlet-side manifold aperture, said plurality of conductive separators comprise a combination of two separator members consisting of an anode-side separator member and a cathode-side separator member, each separator member comprising at least a fuel gas inlet-side manifold aperture, a fuel gas outlet-side manifold aperture, a cooling water inlet-side manifold aperture, and a cooling water outlet-side manifold aperture, said two separator members being combined in such a manner that their backsides are in contact with each other, said anode-side separator member further comprises: a gas flow channel for supplying the fuel gas to said anode which is formed on an anode-side of the anode-side separator member; and an inlet-side through hole and an outlet-side through hole for fuel gas penetrating the anode-side separator member which are formed at an inlet-side end and an outlet-side end of said gas flow channel, said cathode-side separator member further comprises: an inlet-side through hole and an outlet-side through hole for fuel gas communicating with said inlet-side and outlet-side through holes for fuel gas of said anode-side separator member; and an inlet-side connection groove and an outlet-side connection groove for connecting said inlet-side and outlet-side through holes for fuel gas of said cathode-side separator member with said fuel gas inlet-side manifold aperture and said fuel gas outlet-side manifold aperture, respectively, which are formed on a cathode-side of the cathode-side separator member, at least one of said two separator members has, on the backside thereof, a cooling water flow channel communicating with said cooling water inlet-side manifold aperture and said cooling water outlet-side manifold aperture such that the cooling water flow channel is formed between said two separator members, and said respective manifold apertures of said at least one separator communicate with said corresponding manifold apertures of each of said two separator members.

6. The polymer electrolyte fuel cell in accordance with claim 5, wherein said at least one separator further comprises an oxidant gas inlet-side manifold aperture and an oxidant gas outlet-side manifold aperture, said two separator members further comprise an oxidant gas inlet-side manifold aperture and an oxidant gas outlet-side manifold aperture, said cathode-side separator member further comprises: a gas flow channel for supplying the oxidant gas to said cathode which is formed on said cathode-side; and an inlet-side through hole and an outlet-side through hole for oxidant gas penetrating the cathode-side separator member which are formed at an inlet-side end and an outlet-side end of said gas flow channel, said anode-side separator member further comprises: an inlet-side through hole and an outlet-side through hole for oxidant gas communicating with said inlet-side and outlet-side through holes for oxidant gas of said cathode-side separator member; and an inlet-side connection groove and an outlet-side connection groove for connecting said inlet-side and outlet-side through holes for oxidant gas of said anode-side separator member with said oxidant gas inlet-side manifold aperture and said oxidant gas outlet-side manifold aperture, respectively, which are formed on said anode-side, and said respective oxidant gas manifold apertures of said at least one separator communicate with said corresponding oxidant gas manifold apertures of each of said two separator members.

7. The polymer electrolyte fuel cell in accordance with claim 4, wherein said membrane electrode assembly further comprises a gasket covering an outer periphery of said anode and said cathode, and said gasket comprises a fuel gas inlet-side manifold aperture, a fuel gas outlet-side manifold aperture, an oxidant gas inlet-side manifold aperture, an oxidant gas outlet-side manifold aperture, a cooling water inlet-side manifold aperture, and a cooling water outlet-side manifold aperture, said respective manifold apertures of said gasket communicating with said corresponding manifold apertures of each of said two separator members.

8. The polymer electrolyte fuel cell in accordance with claim 6, wherein said membrane electrode assembly further comprises a gasket covering an outer periphery of said anode and said cathode, and said gasket comprises a fuel gas inlet-side manifold aperture, a fuel gas outlet-side manifold aperture, an oxidant gas inlet-side manifold aperture, an oxidant gas outlet-side manifold aperture, a cooling water inlet-side manifold aperture, and a cooling water outlet-side manifold aperture, said respective manifold apertures of said gasket communicating with said corresponding manifold apertures of each of said two separator members.

* * * * *